C. EDELEN.
DEMOUNTABLE RIM.
APPLICATION FILED OCT. 13, 1917.

1,270,130.

Patented June 18, 1918.

Witnesses
Paul M. Hunt
E. M. Springer

Inventor
Charles Edelen
By Victor J. Evans
Attorney

UNITED STATES PATENT OFFICE.

CHARLES EDELEN, OF BARDSTOWN, KENTUCKY.

DEMOUNTABLE RIM.

1,270,130.  Specification of Letters Patent.  Patented June 18, 1918.

Application filed October 13, 1917. Serial No. 196,453.

*To all whom it may concern:*

Be it known that I, CHARLES EDELEN, a citizen of the United States, residing at Bardstown, in the county of Nelson and State of Kentucky, have invented new and useful Improvements in Demountable Rims, of which the following is a specification.

This invention relates to a demountable rim for the wheels of automobiles and the like, and the invention consists in the novel construction, combination and arrangement of elements hereinafter described and claimed.

Briefly described the invention contemplates the use of a plurality of rim members each provided with a flanged portion on its outer side, one of said members comprising a main portion of considerable extent as compared with the other member and tapered for receiving said second member; and also contemplates the use of an expanding device comprising an inner locking ring with means thereon for securing the meeting edges of the ring and forcing the latter into positive engagement with the rim members first named. The invention also contemplates the use of means carried by one of the rim members adapted to project through the adjacent rim member to prevent the circumferential movement of the elements with reference to each other.

Figure 1:
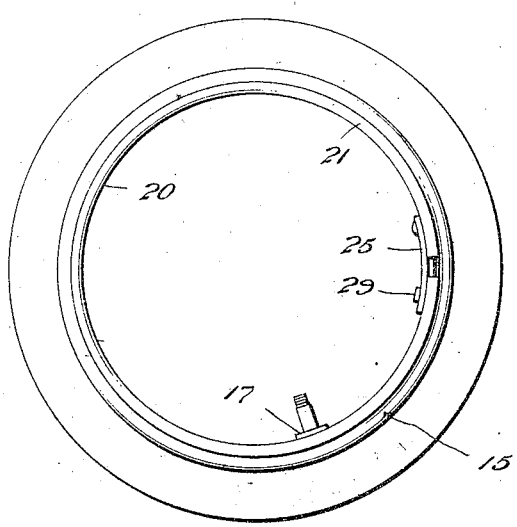
Figure 1 is a view in side elevation with a tire in position on the rim.
Figure 2:
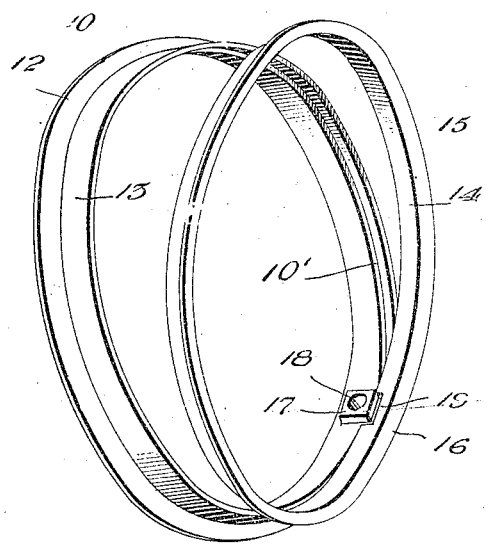
Fig. 2 is a perspective view showing the rim members separated.
Figure 3:
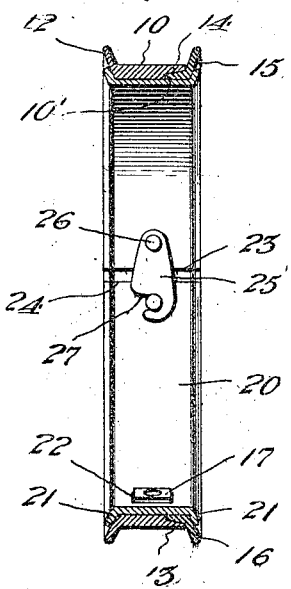
Fig. 3 is a view in vertical section through the rim members and the expansible ring.
Figure 4:
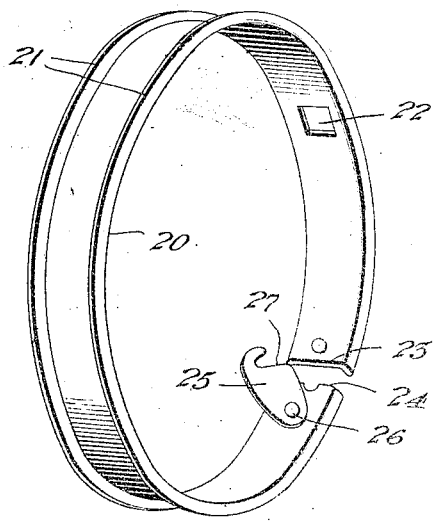
Fig. 4 is a perspective view of the expansible ring.

The large rim member is designated 10 and includes a flange 12 on its outer side and a main portion designated 13 which is slightly tapered for the purpose of accommodating the tapered portion 14 of the small rim member 15. The rim member last named is provided with a flange 16 corresponding to the flange 12 first mentioned.

Rim member 10 carries an offset device 17 provided with aperture 18 for the accommodation of the valve of the tire, this offset member being engaged by the cutaway portion 19 of rim member 15 preventing circumferential movement of members 10 and 15 with reference to each other. A locking ring 20 is provided with flanges 21 on the edges, and has an aperture 22 corresponding with the offset portion 17. The meeting ends 23 and 24 of the ring 20 are secured by means of a locking member 25 pivoted at 26 and comprising a hook having a cam surface 27 at the point indicated, this cam surface engaging the pin 29 and serving to expand the ring sufficiently to bring it into positive contact with the rim members 10 and 15. While I have referred to meeting edges 23 and 24 it will be understood that these edges approach one another but are not necessarily in contact.

The rim described above is intended to be fastened on the wheel in the usual manner and to retain thereon any of the usual forms of tire, the formation of the rim members 10 and 16 being adapted to the tire to be used. By the use of the device a tire may be changed in a very few minutes, there being no elements which will hinder the rapid manipulation of the detachable portions.

In view of the formation of the member 10, as indicated at 10', a substantially continuous inner surface is provided when rim members 10 and 15 are placed together.

What is claimed is:

1. A rim comprising a plurality of telescoping members one of said members carrying a projecting device and the other of said members being provided with an opening receiving said projecting device, an expansible ring provided with an opening also receiving said projecting device, said ring including flanges engaging the edges of the telescoping members, and a locking member comprising a hook provided with a cam portion adjacent to the bill of the hook and adapted to separate the approaching ends of the annular ring member and to expand the latter, and a pin on one of said approaching ends for coöperation with said hook.

2. In a device of the class described, a two-part wheel rim, an expansible ring mounted therein, and locking and expanding means for the ring comprising a hook having a cam portion adjacent to the bill of the hook, said hook being mounted on one of the ends of the ring, and a pin mounted on the complementary end thereof and engaged by the cam surface and then by the bill of the hook.

In testimony whereof I affix my signature.

CHARLES EDELEN.